United States Patent
Huff et al.

(10) Patent No.: US 9,415,335 B2
(45) Date of Patent: Aug. 16, 2016

(54) LIQUID VAPOR PHASE SEPARATION APPARATUS

(75) Inventors: Hans-Joachim Huff, Mainz (DE); Kursten Lamendola, Chittenango, NY (US); Zvonko Asprovski, Liverpool, NY (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 13/984,312

(22) PCT Filed: Feb. 7, 2012

(86) PCT No.: PCT/US2012/024086
§ 371 (c)(1),
(2), (4) Date: Aug. 8, 2013

(87) PCT Pub. No.: WO2012/112338
PCT Pub. Date: Aug. 23, 2012

(65) Prior Publication Data
US 2013/0312376 A1    Nov. 28, 2013

Related U.S. Application Data

(60) Provisional application No. 61/442,541, filed on Feb. 14, 2011.

(51) Int. Cl.
*B04C 3/00* (2006.01)
*B01D 45/16* (2006.01)
(Continued)

(52) U.S. Cl.
CPC ............... *B01D 45/16* (2013.01); *F25B 43/00* (2013.01); *F25B 1/10* (2013.01); *F25B 2341/0662* (2013.01); *F25B 2400/02* (2013.01);
(Continued)

(58) Field of Classification Search
CPC .......... B01D 45/16; B01D 45/12; B04C 3/06; B04C 5/103; B04C 2003/006
USPC ........................................... 55/456–457, 447
See application file for complete search history.

(56) References Cited

U.S. PATENT DOCUMENTS

| 2,229,860 A | 2/1941 | McGurdy, H. |
| 2,316,729 A * | 4/1943 | Tryon .............................. 96/212 |
| 2,970,669 A * | 2/1961 | Bergson ........................... 96/139 |

(Continued)

FOREIGN PATENT DOCUMENTS

| CH | 46330 A | 12/1908 |
| CN | 1762606 A | 4/2006 |

(Continued)

OTHER PUBLICATIONS

Notification of Transmittal of the International Preliminary Report on Patentability and the Written Opinion of the International Searching Authority, or the Declaration; PCT/US2012/024086; Aug. 29, 2013.

(Continued)

*Primary Examiner* — Dung H Bui
(74) *Attorney, Agent, or Firm* — Cantor Colburn LLP

(57) ABSTRACT

A phase separation apparatus is provided for separating a two-phase fluid flow into a liquid phase portion and a vapor phase portion. The phase separation apparatus may be applied to the separation of a two-phase refrigerant flow in a refrigerant vapor compression system operating in a transcritical cycle.

6 Claims, 4 Drawing Sheets

(51) Int. Cl.
*F25B 43/00* (2006.01)
*F25B 1/10* (2006.01)

(52) U.S. Cl.
CPC ... *F25B2600/026* (2013.01); *F25B 2600/2509* (2013.01); *F25B 2600/2513* (2013.01)

(56) References Cited

U.S. PATENT DOCUMENTS

| | | | |
|---|---|---|---|
| 3,232,341 | A | 2/1966 | Woodworth, L. R. |
| 3,800,513 | A * | 4/1974 | Lappin et al. ............ 96/319 |
| 3,822,533 | A | 7/1974 | Oranje |
| 4,622,048 | A | 11/1986 | Roberts et al. |
| 4,678,588 | A | 7/1987 | Shortt |
| 5,113,671 | A * | 5/1992 | Westermeyer ............ 62/468 |
| 5,334,239 | A | 8/1994 | Choe et al. |
| 5,692,389 | A | 12/1997 | Lord et al. |
| 5,724,830 | A | 3/1998 | Otis et al. |
| 5,840,198 | A * | 11/1998 | Clarke .................. 210/802 |
| 6,298,687 | B1 | 10/2001 | Dienhart et al. |
| 6,385,980 | B1 | 5/2002 | Sienel |
| 6,463,757 | B1 | 10/2002 | Dickson et al. |
| 6,485,536 | B1 * | 11/2002 | Masters .................. 55/337 |
| 6,598,422 | B1 | 7/2003 | Smith |
| 6,851,277 | B1 | 2/2005 | Sishtla |
| 7,069,741 | B2 | 7/2006 | Sishtla |
| 7,356,998 | B2 | 4/2008 | Lee et al. |
| 7,484,374 | B2 | 2/2009 | Pham et al. |
| 7,827,809 | B2 | 11/2010 | Pham et al. |
| 2001/0003892 | A1 * | 6/2001 | Rikyuu et al. ............ 55/315.2 |
| 2007/0251256 | A1 | 11/2007 | Pham et al. |

FOREIGN PATENT DOCUMENTS

| | | |
|---|---|---|
| CN | 2832267 Y | 11/2006 |
| DE | 150089 | 3/1904 |
| DE | 1068221 B | 11/1959 |
| EP | 0140402 | 5/1985 |
| EP | 0487959 A2 | 6/1992 |
| FR | 123919 A | 7/1960 |
| GB | 1083264 A | 9/1967 |
| JP | 04366377 | 12/1982 |
| JP | 07247820 A | 9/1995 |
| JP | 2003126634 05 | 5/2003 |

OTHER PUBLICATIONS

Notification of Transmittal of the International Search Report and the Written Opinion of the International Searching Authority, or the Declaration; PCT/US2012/024086; Dec. 11, 2012.
Singapore Written Opinion and Search Report for application SG 2013060744, mailed Sep. 19, 2014, 7 pages.
Chinese Office Action for application CN2012800088079, dated Dec. 11, 2014, 7 pp.
Chinese Search Report for application Cn 201280008807.9, dated Dec. 3, 2014, 3 pp.

* cited by examiner

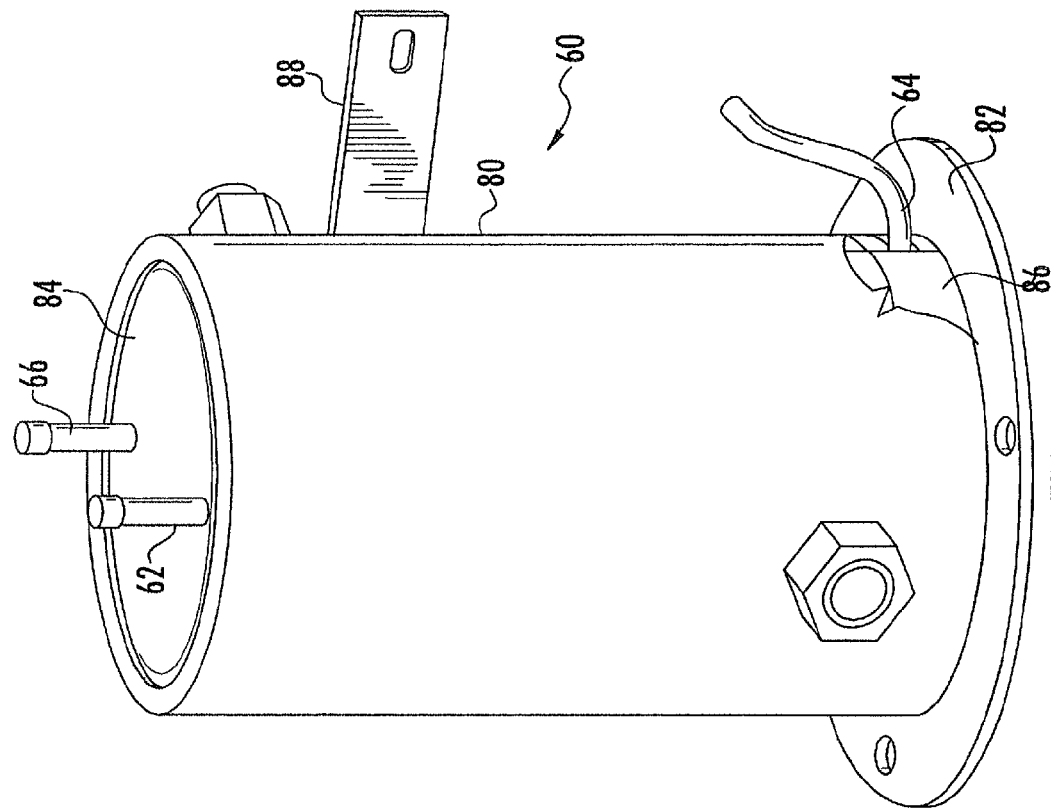
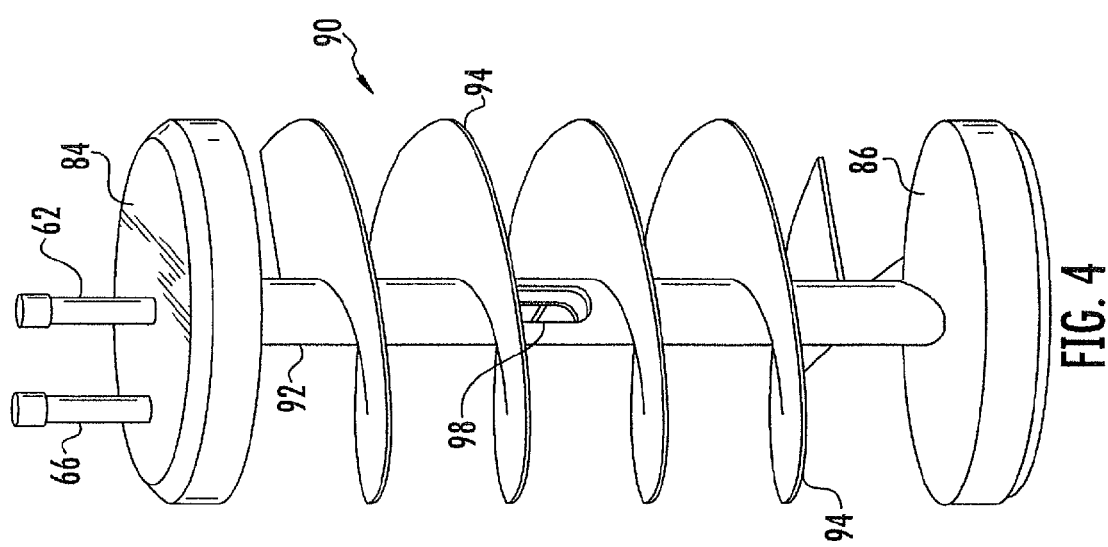
FIG. 5
FIG. 4

LIQUID VAPOR PHASE SEPARATION APPARATUS

CROSS REFERENCE TO RELATED APPLICATION

This application claims priority to U.S. Provisional Patent Application Ser. No. 61/442,541 entitled "Liquid Vapor Phase Separation Apparatus" filed on Feb. 14, 2011. The content of this application is incorporated herein by reference in its entirety.

BACKGROUND OF THE INVENTION

This invention relates generally to liquid vapor phase separation and, more particularly, to the separation of a two-phase refrigeration flow into a liquid phase portion and a vapor phase portion in a refrigerant vapor compression system having a flash tank economizer and operating in a transcritical cycle.

Refrigerant vapor compression systems are well known in the art and commonly used in mobile refrigeration systems, such as transport refrigeration systems for refrigerating air or other gaseous fluid supplied to a temperature controlled cargo space of a truck, trailer, container or the like for transporting perishable items, fresh or frozen, by truck, rail, ship or intermodal.

Conventional refrigerant vapor compression systems used in transport refrigeration applications typically include a compressor, a refrigerant heat rejection heat exchanger, and a refrigerant heat absorption heat exchanger arranged in a closed loop refrigerant circuit. An expansion device, commonly an expansion valve, disposed in the refrigerant circuit upstream, with respect to refrigerant flow, of the refrigerant heat absorption heat exchanger and downstream of the refrigerant heat rejection heat exchanger. These basic refrigerant vapor compression system components are interconnected by refrigerant lines and are arranged in accord with known refrigerant vapor compression cycles. Refrigerant vapor compression systems may be operated in either a subcritical pressure regime or a transcritical pressure regime depending upon the particular refrigerant in use.

Refrigerant vapor compression systems operating in the subcritical regime are commonly charged with fluorocarbon refrigerants such as, but not limited to, hydrochlorofluorocarbons (HCFCs), such as R22, and more commonly hydrofluorocarbons (HFCs), such as R134a, R410A, R404A and R407C. In refrigerant vapor compression systems operating in a subcritical cycle, both the refrigerant heat rejection heat exchanger, which functions as a refrigerant vapor condenser, and the refrigerant heat absorption heat exchanger, which functions as a refrigerant liquid evaporator, operate at refrigerant temperatures and pressures below the refrigerant's critical point.

However, interest is being shown in "natural" refrigerants, such as carbon dioxide, for use in air conditioning and transport refrigeration systems instead of HFC refrigerants. Because carbon dioxide has a low critical temperature and a low liquid phase density to vapor phase density ratio, most refrigerant vapor compression systems charged with carbon dioxide as the refrigerant are designed for operation in the transcritical pressure regime. In refrigerant vapor compression systems operating in a transcritical cycle, the refrigerant heat rejection heat exchanger, which functions as a refrigerant vapor cooler rather than a refrigerant vapor condenser, operates at a refrigerant temperature and pressure in excess of the refrigerant's critical point, while the refrigerant heat absorption heat exchanger, which functions as a refrigerant evaporator, operates at a refrigerant temperature and pressure in the subcritical range.

It is also known practice to incorporate an economizer circuit into the refrigerant circuit so that the refrigerant vapor compression system may be selectively operated in an economized mode to increase the capacity of the refrigerant vapor compression system. In some refrigerant vapor compression systems operating in a transcritical mode, the economizer circuit includes a flash tank incorporated into the refrigerant circuit between the gas cooler and the evaporator. In such case, the refrigerant vapor leaving the gas cooler is expanded through an expansion device, such as a thermostatic expansion valve or an electronic expansion valve, prior to entering the flash tank wherein the expanded refrigerant separates into a liquid refrigerant component and a vapor refrigerant component. The vapor component of the refrigerant is thence directed from the flash tank into an intermediate pressure stage of the compression process. The liquid component of the refrigerant is directed from the flash tank through the system's main expansion valve prior to entering the evaporator. U.S. Pat. No. 6,385,980 discloses a transcritical refrigerant vapor compression system incorporating a flash tank economizer in the refrigerant circuit between the gas cooler and the evaporator.

Being mobile, transport refrigerant vapor compression systems are subject to vibration and movements not experienced by stationary refrigerant vapor compression systems. Transport refrigeration systems are also subject to size restrictions due to limitations on available space and weight considerations due to fuel economy not generally associated with stationary refrigerant vapor compression systems, such as air conditioners and heat pumps. Accordingly, a desire exists for phase separation apparatus that is easy to manufacture, compact and lightweight, yet structurally durable in a mobile refrigeration systems environment and at refrigerant pressures associated with application in a refrigerant vapor compression system operating in a transcritical pressure regime.

SUMMARY OF THE INVENTION

A phase separation apparatus is provided for separating a two-phase fluid flow into a liquid phase portion and a vapor phase portion. The phase separation apparatus may be applied to the separation of a two-phase refrigerant flow in a refrigerant vapor compression system operating in a transcritical cycle.

The phase separation apparatus comprises a flash tank having a shell defining an interior volume extending between an upper end cap and a lower end cap of the shell and an auger disposed within the interior volume and extending along a central vertical axis of the shell. The auger includes a longitudinally elongated support tube extending along the central vertical axis of the shell and a helical spiral member extending about the vertical support tube and defining in association with the shell a continuous spiral fluid flow passage within the interior volume. A vapor phase fluid outlet opens into an upper region of the interior volume and a liquid phase fluid outlet opens into a lower region of the interior volume. A fluid inlet opens through the upper end cap.

In an embodiment, the elongated support tube has an open upper end and at least one outlet in the sidewall of the support tube spaced from the open upper end and opening into a central region of the interior volume. In this embodiment, the fluid inlet opens through the upper end cap into the open upper end of the support tube. Thus, the support tube defines a fluid flow conduit establishing fluid communication between the fluid inlet opening through the upper end cap and a central region of the interior volume whereby two-phase fluid is delivered into a central region of the continuous spiral fluid flow passage.

In an embodiment, the fluid inlet includes an inlet tube penetrating the upper end cap and extending into the interior volume to open into a central region of the continuous spiral fluid flow passage. The inlet tube may be configured within the interior volume so as to discharge received two-phase fluid into the continuous spiral fluid flow passage generally tangentially to a circumferentially directed path.

BRIEF DESCRIPTION OF THE DRAWINGS

For a further understanding of the disclosure, reference will be made to the following detailed description which is to be read in connection with the accompanying drawing, where:

FIG. 4 is a perspective view showing the auger assembly and both end caps of the first exemplary embodiment of the phase separation apparatus shown in FIG. 2 and FIG. 3;

FIG. 5 is a perspective view of a second exemplary embodiment of the phase separation apparatus disclosed herein;

DETAILED DESCRIPTION OF THE INVENTION

Figure 1:
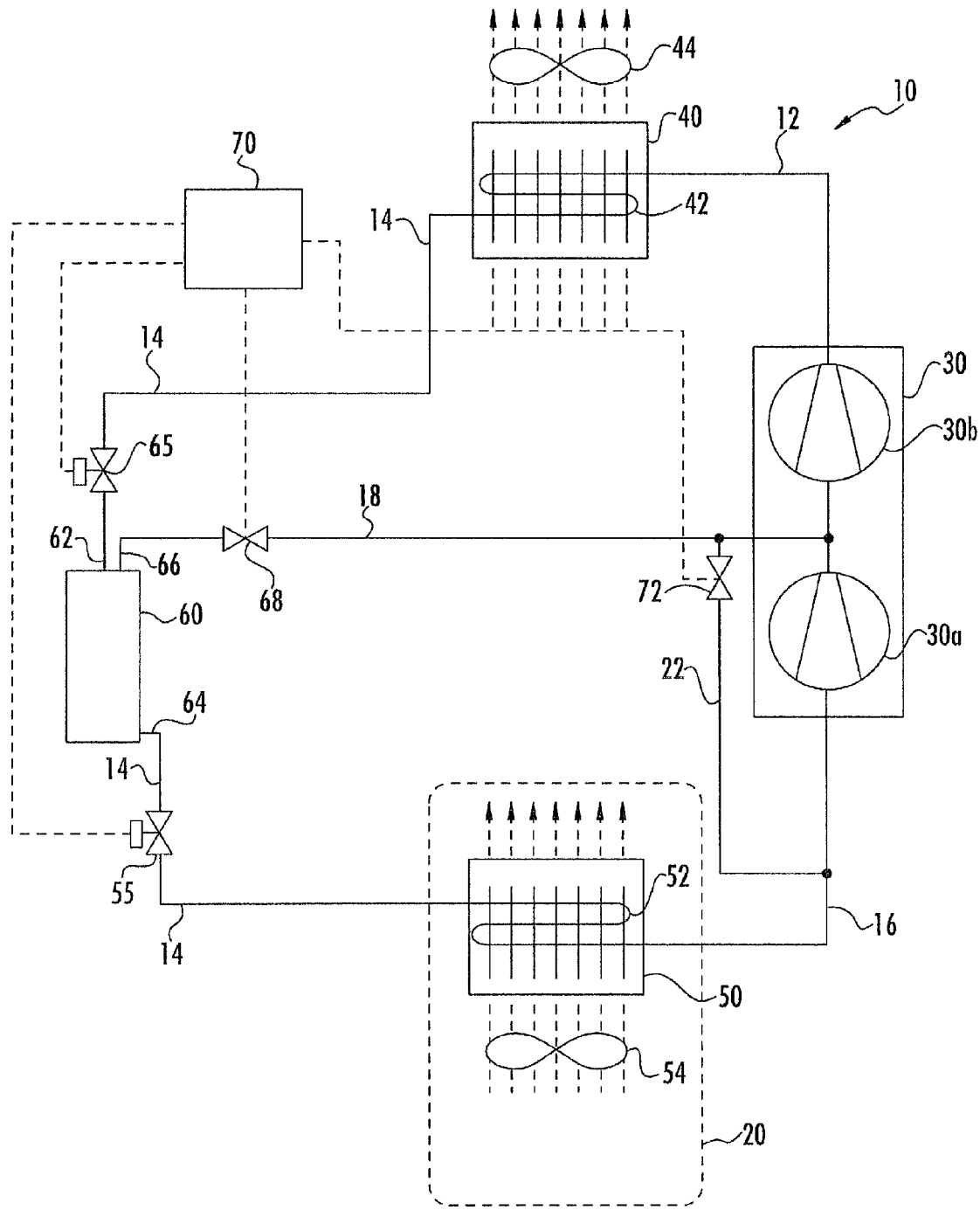
FIG. 1 is a schematic diagram illustrating an exemplary embodiment of a refrigerant vapor compression system operable in a transcritical cycle having a phase separation apparatus functioning as a flash tank economizer.

Referring now to FIG. 1, there is depicted therein an exemplary embodiment of a refrigerant vapor compression system 10 suitable for use in a transport refrigeration system for refrigerating the atmosphere within the temperature controlled cargo space 20 of a truck, trailer, container or other mobile refrigeration system for transporting perishable goods, fresh or frozen. The refrigerant vapor compression system 10 is particularly adapted for operation in a transcritical cycle with a low critical temperature refrigerant, such as for example, but not limited to, carbon dioxide. In the depicted embodiment, the refrigerant vapor compression system 10 includes a multi-step compression device 30, a refrigerant heat rejection heat exchanger 40 and a refrigerant heat absorption heat exchanger 50, also referred to herein as an evaporator, with refrigerant lines 12, 14 and 16 connecting the aforementioned components in refrigerant flow communication in a refrigerant circuit.

A primary expansion device 55, such as for example an electronic expansion valve or a thermostatic expansion valve, operatively associated with the evaporator 50 is disposed in the refrigerant circuit in refrigerant line 14 between the refrigerant heat rejection heat exchanger 40 and the evaporator 50. Additionally, a flash tank 60 is disposed in refrigerant line 14 of the primary refrigerant circuit downstream with respect to refrigerant flow of the refrigerant heat rejection heat exchanger 40 and upstream with respect to refrigerant flow of the evaporator 50. A secondary expansion device 65, such as for example an electronic expansion valve, is disposed in the refrigerant circuit in refrigerant line 14 between the refrigerant heat rejection heat exchanger 40 and the flash tank 60. Therefore, the flash tank 60 is disposed in the refrigerant circuit upstream of the primary expansion device 65 and downstream of the secondary expansion device 65.

In a refrigerant vapor compression system operating in a transcritical cycle, the refrigerant heat rejection heat exchanger 40 operates at a pressure above the critical point of the refrigerant and therefore functions to cool supercritical refrigerant vapor passing therethrough in heat exchange relationship with a cooling medium, such as for example, but not limited to ambient air or water, and may be also be referred to herein as a gas cooler. In the depicted embodiments, the refrigerant heat rejection heat exchanger 40 includes a finned tube heat exchanger 42, such as for example a fin and round tube heat exchange coil or a fin and mini-channel flat tube heat exchanger, through which the refrigerant passes in heat exchange relationship with ambient air being drawn through the finned tube heat exchanger 42 by the fan(s) 44 associated with the gas cooler 40.

The refrigerant heat absorption heat exchanger 50 serves an evaporator wherein refrigerant liquid is passed in heat exchange relationship with a fluid to be cooled, most commonly air or an air and inerting gas mixture, drawn from and to be returned to a temperature controlled environment 20, such as the cargo box of a refrigerated transport truck, trailer or container. In the depicted embodiments, the refrigerant heat absorption heat exchanger 50 comprises a finned tube heat exchanger 52 through which refrigerant passes in heat exchange relationship with air drawn from and returned to the refrigerated cargo box 20 by the evaporator fan(s) 54 associated with the evaporator 50. The finned tube heat exchanger 52 may comprise, for example, a fin and round tube heat exchange coil or a fin and mini-channel flat tube heat exchanger.

The compression device 20 functions to compress the refrigerant to a supercritical pressure and to circulate refrigerant through the refrigerant circuit. The compression device 20 may comprise a single multiple-stage refrigerant compressor, such as for example a scroll compressor, a screw compressor or a reciprocating compressor, disposed in the primary refrigerant circuit and having a first compression stage 20a and a second compression stage 20b, such as illustrated in FIG. 1. Alternatively, the compression device 20 may comprise a pair of independent compressors 20a and 20b, connected in series refrigerant flow relationship in the primary refrigerant circuit. In the independent compressor embodiment, the compressors 20a and 20b may be scroll compressors, screw compressors, reciprocating compressors, rotary compressors or any other type of compressor or a combination of any such compressors.

In operation, high temperature, supercritical pressure refrigerant vapor discharged from the second compression stage or second compressor 20b of the compression device is cooled to a lower temperature as it traverses the heat exchanger 42 of the gas cooler 40 before traversing the secondary expansion device 65. In traversing the secondary expansion device 65, the supercritical pressure refrigerant vapor is expanded to a lower subcritical pressure sufficient to establish a two-phase mixture of refrigerant vapor and refrigerant liquid prior to entering the flash tank 60.

The two-phase refrigerant flow having traversed the secondary expansion device 65 passes into the interior volume of the flash tank 60 through a fluid inlet 62 and separates into a vapor phase which migrates upwardly into the upper region of the interior volume of the flash tank 60 and a liquid phase which migrates downwardly into the lower region of the interior volume of the flash tank 60. The flash tank 60 also includes a liquid outlet 64 in fluid communication with the lower region of the interior volume of the flash tank 60 and a vapor outlet 66 in fluid communication with the upper region of the interior volume of the flash tank 60.

The liquid phase refrigerant, which is typically saturated liquid, passes from the lower region of the flash tank 60 through the liquid outlet 64 into refrigerant line 14 of the refrigerant circuit. The liquid phase refrigerant passing from the flash tank 60 traverses the primary refrigerant circuit expansion device 55 interdisposed in refrigerant line 14 upstream with respect to refrigerant flow of the evaporator 50. As this liquid refrigerant traverses the primary expansion device 55, it expands to a lower pressure and temperature before entering the evaporator 50. The evaporator 50 constitutes a refrigerant evaporating heat exchanger through which expanded refrigerant passes in heat exchange relationship with the air to be cooled, whereby the refrigerant is vaporized and typically superheated. As in conventional practice, the primary expansion device 55 meters the refrigerant flow through the refrigerant line 14 to maintain a desired level of superheat in the refrigerant vapor leaving the evaporator 50 to ensure that no liquid is present in the refrigerant leaving the evaporator. The low pressure refrigerant vapor leaving the evaporator 50 returns through refrigerant line 16 to the suction port of the first compression stage 20a of the compression device 20.

The refrigerant vapor compression system 10 also includes an economizer circuit that includes a refrigerant vapor injection line 18 that connects to the vapor outlet 66 thereby establishing refrigerant flow communication between the upper region of the interior volume defined within the flash tank 60 and an intermediate stage of the compression process. A flow control valve 68, such as an on/off solenoid valve, may be interdisposed in the vapor injection line 18 whereby the flow of refrigerant through the vapor injection line 18 may be selectively permitted when it is desired to operate the refrigerant vapor compression system 10 in an economized mode or terminated when it is desired to operate the refrigerant vapor compression system 10 in a non-economized mode.

The refrigerant vapor compression system 10 may also include a compressor unload refrigerant line 22 that establishes refrigerant flow communication between an intermediate pressure stage of the compression device and the suction pressure portion of the refrigerant circuit, i.e. refrigerant line 16 extending between the outlet of the evaporator 50 and the suction inlet of the first stage 20a of the compression device 20. A flow control valve 72, such as an on/off solenoid valve, may be interdisposed in the compressor unload refrigerant line 22 whereby the flow of refrigerant through the refrigerant line 22 may be selectively permitted when it is desired to operate the refrigerant vapor compression system 10 in a compressor unload mode or terminated when it is desired to operate the refrigerant vapor compression system 10 in a normal loaded mode.

The refrigerant vapor compression system 10 may further include a control system including a controller 70 configured to operate the refrigerant vapor compression system 10 to maintain a predetermined thermal environment within the cargo box 20 wherein the product being transported is stored. The controller 70 maintains the predetermined environment by selectively controlling, in a well known manner, the operation of the compressor 30, the condenser fan(s) 44 associated with the condenser heat exchanger coil 42, the evaporator fan(s) 54 associated with the evaporator heat exchanger coil 52, and a plurality of refrigerant flow control devices operatively associated with the control 70, which may include the primary expansion device 55, the secondary expansion device 65, flow control valve 68 and flow control valve 72.

Figure 2:
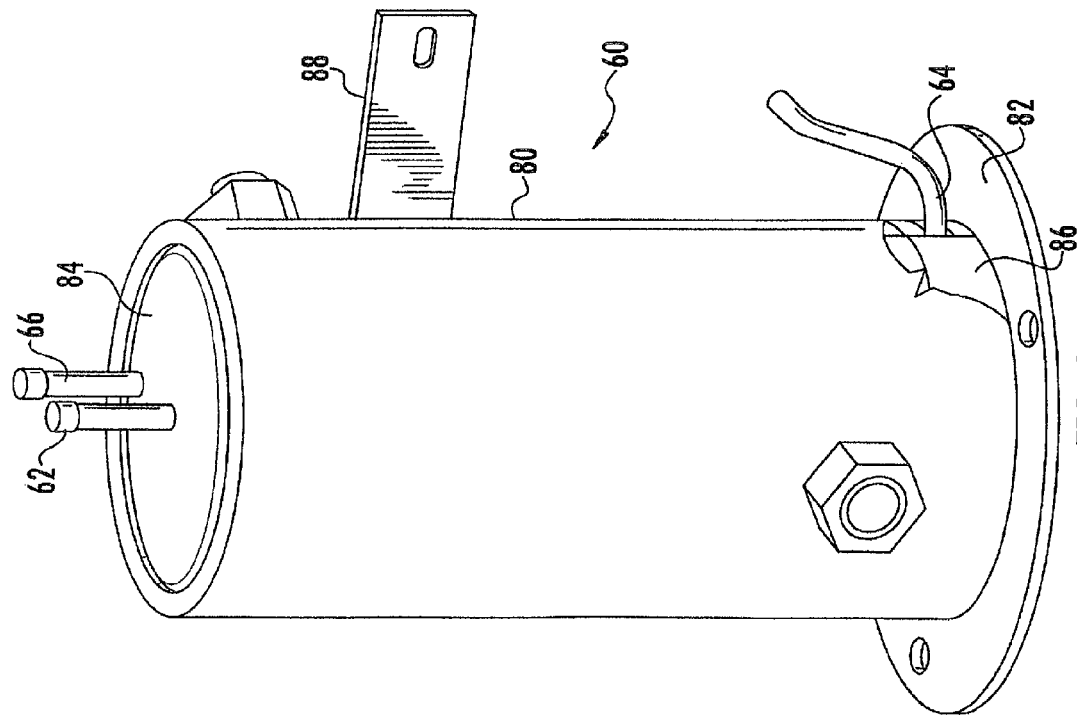
FIG. 2 is a perspective view of a first exemplary embodiment of the phase separation apparatus disclosed herein.

As discussed hereinbefore, the flash tank 60 functions as and comprises a phase separation apparatus wherein a two-phase fluid flow received within the interior volume thereof is separated into a vapor phase portion collecting in an upper region of the interior volume and a liquid phase portion collecting in a lower region of the interior volume. Referring now to FIGS. 2 and 5, the phase separation apparatus 60 includes a shell 80 defining an interior volume having an upper region, a lower region and a middle region extending therebetween. The shell 80 has a generally cylindrical body extending along a vertical axis between an upper end cap 84 and a lower end cap 86. The upper and lower end caps 84, 86 are attached to the open upper and lower ends, respectively, of the cylindrical body of the shell 80 in such a manner, for example by welding or brazing or the like, as to form a sealed enclosure defining the interior volume of the phase separator 60. The shell 80 is also mounted to an annular ring-like base 82, for example by welding or brazing or the like, which serves as a mounting base for facilitating bolting or otherwise securing the phase separator apparatus 60 to a structural support surface when installed on a transport refrigeration system. A support arm 88 may be attached to the exterior of the shell 80, such as by welding or brazing or the like, for further securing the phase separator apparatus 60 to a structural support surface when installed on a transport refrigeration system.

Figure 3:
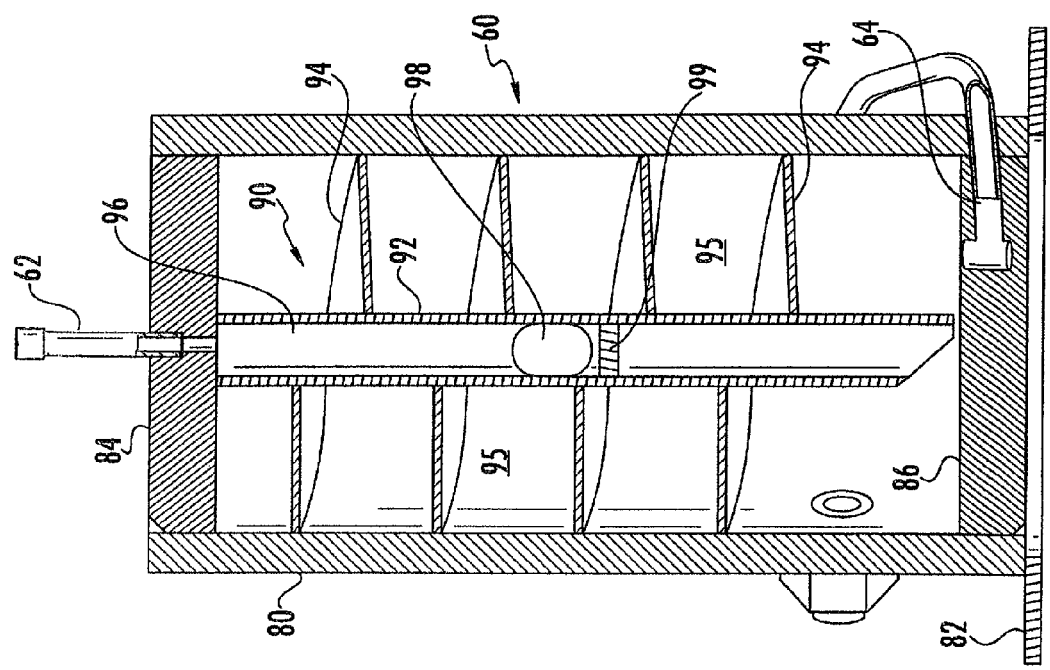
FIG. 3 is a partly sectioned elevation view of the first exemplary embodiment of the phase separation apparatus shown in FIG. 2.

Referring now to FIGS. 3, 4 and 6, 7, the phase separation apparatus 60 further includes an auger assembly 90 that is disposed within and extends along the central vertical axis of the shell 80. The auger assembly 90 includes a longitudinally extending support tube 92 and a helical spiral member 94 extending about the support tube 92. When installed within the shell 80, the helical spiral member 94 defines in association with the shell 80 a continuous spiral fluid flow passage 95 within the interior volume of the phase separator apparatus 60. The auger assembly 90 may have a height substantially the same as the height of the shell 80 whereby the continuous spiral fluid flow passage 95 winds about the support tube 92 and passes through each of the central region and into both the lower region and the upper region of the interior volume, as depicted in FIGS. 3 and 5. The helical spiral member 94 should terminate at least ¼ turn, and generally between ¼ and ½ turn, from both the upper end plate 84 and the lower end plate 86 rather than actually contacting either the upper end cap 84 or the lower end cap 86. However, if desired, the auger assembly have a height that is less than the height of the shell, in which case the foreshortened helical spiral member of the auger assembly may be arranged at mid-height of the support tube or shifted upwardly or downwardly such that the continuous spiral fluid passage does not extend fully into either or both of the upper region or lower region of the inter volume of the phase separation apparatus.

In the depicted embodiments, the vapor phase fluid outlet 66 comprises an outlet tube that axially penetrates the upper end cap 84 to open through the upper end cap 84 into the continuous spiral fluid flow passage 95 in an upper region of the interior volume. The liquid phase fluid outlet 64 opens through the lower end cap 86 into the continuous spiral fluid flow passage 95 in a lower region of the interior volume. In the depicted embodiments, as best seen in FIGS. 3 and 6, the liquid phase fluid outlet 64 is formed by an axially directed passage drilled into the lower end cap 86 through the upper surface thereof for a distance constituting less than the depth of the lower end cap, a radially directed passage drilled into the lower end cap 86 through the side wall thereof to intersect the aforementioned axial passage, and an outlet tube received in and extending externally of the phase separator apparatus 60.

In the exemplary embodiment of the phase separator apparatus 60 depicted in FIGS. 2-4, the elongated support tube 92 has an open upper end and at least one outlet 98 in the sidewall of the support tube 92 spaced from the open upper end and opening into the continuous spiral fluid flow passage 95 in the central region of the interior volume of the phase separation apparatus 60. In this embodiment, the fluid inlet 62 includes an inlet tube that is received within an axially extending passage drilled through the upper end cap 84 along the central axis of the phase separator apparatus 60 to open through the upper end cap 84 into the open upper end of the support tube 92. Thus, the support tube 92 defines a fluid flow conduit 96 establishing fluid communication between the fluid inlet 62 opening through the upper end cap 84 and the central region of the interior volume whereby two-phase fluid is delivered into a central region of the continuous spiral fluid flow passage 95. The at least one outlet 98 may comprise a pair of diametrically opposite outlets in the sidewall of the support tube 92. Additionally, a flow stopper 99 may be disposed within the support tube 92 at a position subadjacent the outlet 98 to close off the conduit 96 thereby ensuring that the two-phase fluid must exit through the outlets 98 in the side wall of the support tube 92 rather than continuing downwardly to exit through the lower end of the support tube 92.

Figure 7:
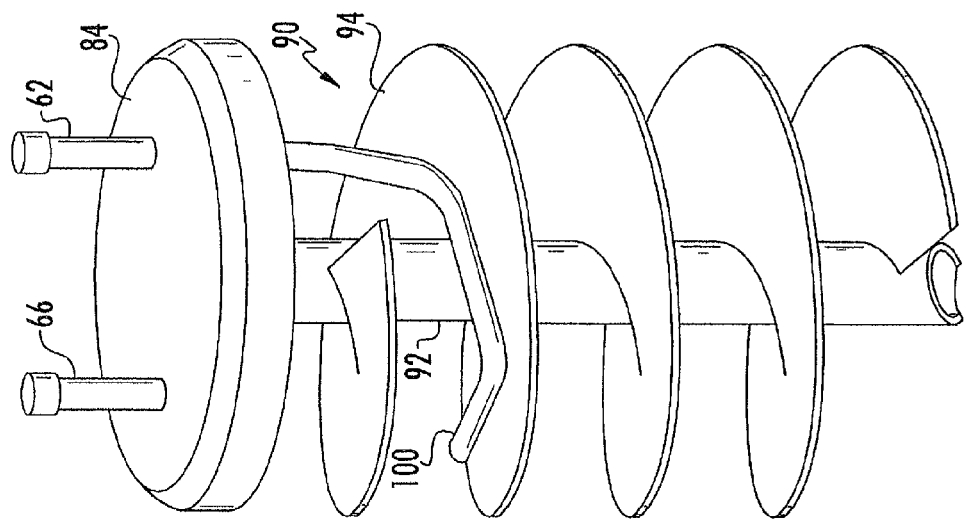
FIG. 7 is a perspective view showing the auger assembly and upper end caps of the second exemplary embodiment of the phase separation apparatus shown in FIG. 5 and FIG. 6.
Figure 6:
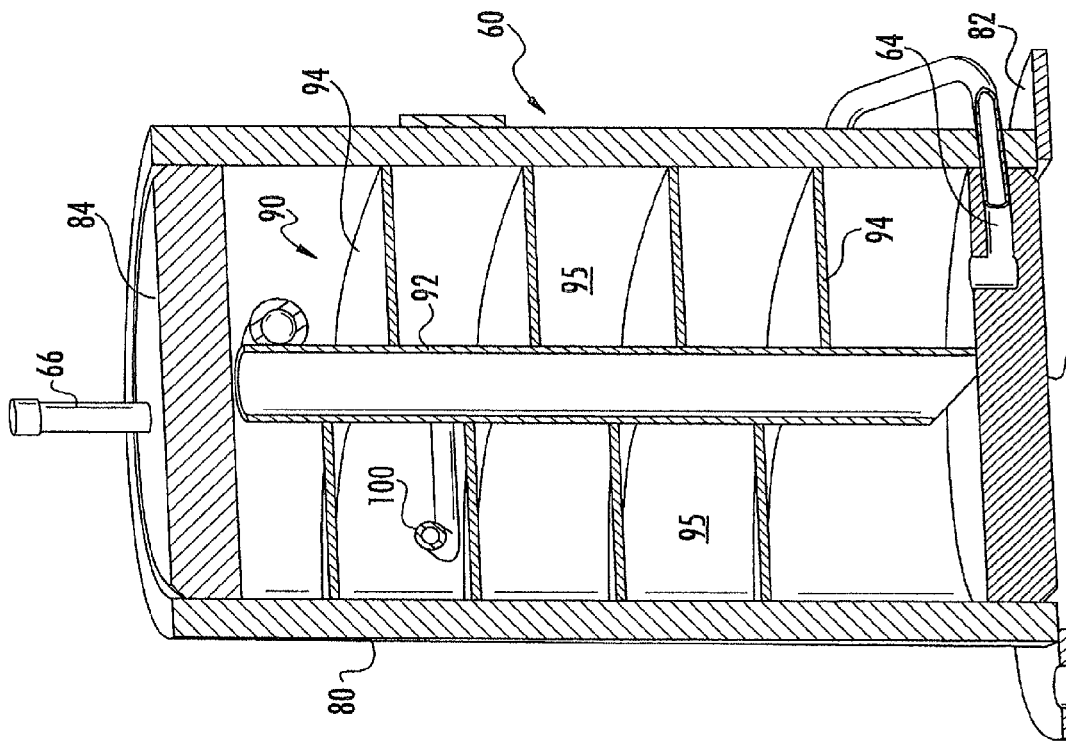
FIG. 6 is a partly sectioned elevation view of the second exemplary embodiment of the phase separation apparatus shown in FIG. 5.

In the exemplary embodiment of the phase separator apparatus 60 depicted in FIGS. 5-7, the fluid inlet 62 includes an inlet tube penetrating the upper end cap at an off-center location, that is displaced radially outwardly from the central axis of the phase separator apparatus 60, and extending into the interior volume to open at its terminus end 100 into the continuous spiral fluid flow passage 95. The inlet tube may be configured within the interior volume so as to discharge the received two-phase fluid into the continuous spiral fluid flow passage 95 generally tangentially to a circumferentially directed path such as depicted in FIG. 7.

When the phase separation apparatus 60 is installed within the refrigerant vapor compression system 10, the phase separation apparatus 60 is interdisposed into refrigeration line 14 between the upstream secondary expansion device 65 and the downstream primary expansion device 55 with the fluid inlet 62 being connected in fluid communication with the upstream segment of refrigerant line 14 and the liquid phase fluid outlet 64 being connected in fluid communication with the downstream segment of refrigerant line 14. Additionally, the vapor phase fluid outlet 66 is connected in fluid communication with refrigerant vapor injection line 16. Therefore, in operation, refrigerant flow having been expanded in traversing the secondary expansion valve 65 will pass from refrigerant line 14 through the two-phase fluid inlet 62 into the continuous spiral fluid flow passage 95. Due to the density differential between the vapor phase and the liquid phase, the vapor phase refrigerant in the entering two-phase flow will tend to flow generally upwardly through the continuous spiral fluid flow passage 95 into an upper region of the interior volume of the phase separation apparatus 60, while the liquid phase of the two-phase flow will tend to flow generally downwardly through the continuous spiral fluid flow passage 95 into the lower region of the interior volume of the phase separation apparatus 60.

Unlike in stationary refrigeration applications, in transport refrigeration applications, the refrigerant vapor compression system is subject to vibration and movement due to the travel along roads, rail and sea. Consequently, in transport refrigeration systems, refrigerant in a phase separation flash tank would be subject to sloshing, which tends to increase intermixing if the vapor and liquid phases of the refrigerant within the flash tank. In the phase separation apparatus 60 disclosed herein, the flights of the helical spiral member 94 tend to reduce sloshing and the resultant intermixing of liquid and vapor phases. Additionally, in the embodiment depicted in FIGS. 2-4, the inside diameter of the central support tube 92 is larger the inside diameter of the fluid inlet 62 which results in a slowing of the two-phase fluid as it enters the flow conduit 96 within the support tube 92. The outlet(s) 98 are also sized to have a flow area that is larger than the flow area of the flow conduit 96, thereby further slowing the flow of two-phase fluid upon entering the continuous spiral fluid flow passage 95. This progressive slowing of the two-phase refrigerant flow enhances the natural separation of the vapor phase and the liquid phase due to the density differential therebetween. Continuing the support tube 92 downwardly beyond the outlet(s) 98 prevents mixing of fluid between the different levels of the helical spiral fluid flow passage 95. As noted previously, the helical spiral member 94 terminates before contacting the lower end cap 86. Therefore, additional devices, such as plates, baffles or a cone, not shown, may be installed on the upper surface of the lower end cap 86 to disrupt circular motion of the liquid phase passing from the spiral fluid flow passage 95, For purposes of illustration, but not limitation, the phase separation apparatus 60 may, for example, have may a shell 80 and end caps 84, 86 made of metal, such as steel, and an auger assembly 90 made of a plastic material thereby reducing the weight of the phase separation apparatus 60. For purposes of further illustration, but not limitation, an exemplary phase separation apparatus 60 may have a shell internal diameter of 6 inches (15.24 centimeters) and a shell internal height of 11 inches (27.94 centimeters), the central support tube 92 may have an internal diameter of 1 inch (2.54 centimeters), the flights of the helical spiral member 94 may be spaced about 2 inches (5.08 centimeters) apart, the inlet tube may have an internal diameter of ⅜ inch (0.95 centimeters), and the outlet 98 may be an oblong opening having a longitudinal dimension (height) of 1½ to 2 inches (3.8 to 5.08 centimeters) and a lateral dimension (width) of nearly 1 inch (2.54 centimeters).

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

Those skilled in the art will recognize that many variations may be made to the particular exemplary embodiments described herein. For example, the phase separation apparatus disclosed herein may also be incorporated as a flash tank economizer in a refrigerant vapor compression system operable in a transcritical cycle with an intercooler disposed between the first and second stages of the compression device such as disclosed in co-pending U.S. provisional patent application Ser. No. 61/329,332, filed Apr. 29, 2010. The phase separation apparatus disclosed herein may also be used in connection with a refrigerant vapor compression system operable in a subcritical cycle, rather than in a transcritical cycle as described hereinbefore.

While the present invention has been particularly shown and described with reference to the exemplary embodiments as illustrated in the drawings, it will be understood by one skilled in the art that various changes in detail may be effected therein without departing from the spirit and scope of the invention as defined by the claims.

We claim:

1. A phase separation apparatus for separating a two-phase fluid flow into a liquid phase portion and a vapor phase portion, comprising:
    a shell having an upper end cap and a lower end cap and defining an interior volume having an upper region, a lower region and a central region between the upper region and the lower region;
    an auger assembly disposed within the interior volume defined by said shell, the auger assembly having an elongated support tube extending along a central vertical axis of said shell and a helical spiral member extending about said support tube and defining in association with said shell a continuous spiral fluid flow passage within the interior volume, said support tube having an open upper end and at least one fluid flow outlet in a sidewall of said support tube spaced from the open upper end and opening into the central region of the interior volume, the at least one flow outlet separate from the open upper end, the at least one fluid flow outlet positioned at a middle portion of the support tube;
    a vapor outlet penetrating through the upper end cap to open in fluid communication with the upper region of the interior volume;
    a liquid outlet penetrating through the lower end cap to open through an upper surface of the lower end cap in fluid communication with the lower region of the interior volume; and
    a fluid inlet penetrating through the upper end cap to open in fluid communication into the open upper end of said support tube to convey fluid from the fluid inlet to the fluid flow outlet in the sidewall of said support tube.

2. The phase separation apparatus as recited in claim 1 wherein the at least one outlet in a sidewall of said support tube comprises an oblong hole having a longitudinal dimension and a lateral dimension, the longitudinal dimension being greater than the lateral dimension.

3. The phase separation apparatus as recited in claim 1 wherein said at least one outlet in a sidewall of said support tube comprises a pair of diametrically opposed openings in the sidewall of said support tube.

4. The phase separation apparatus as recited in claim 1 wherein said fluid inlet tube has a first internal diameter and said support tube has a second internal diameter, the second internal diameter being greater than the first internal diameter.

5. The phase separation apparatus as recited in claim 4 wherein the at least one outlet defines a first flow area and said support tube defines a second flow area, the first flow area being greater than the second flow area.

6. The phase separation apparatus as recited in claim 1 further comprising a flow stopper disposed within said support tube at a position subadjacent the at least one outlet.

* * * * *